United States Patent
Shaw et al.

(10) Patent No.: US 10,429,885 B1
(45) Date of Patent: Oct. 1, 2019

(54) LEANED AXIS, ASYNCHRONOUS, DUAL-AXLE DROP HINGE AND PORTABLE INFORMATION HANDLING SYSTEM COMPRISING THE SAME

(71) Applicant: DELL PRODUCTS L.P., Round Rock, TX (US)

(72) Inventors: Timothy C. Shaw, Austin, TX (US); Nicholas G. DiLoreto, Austin, TX (US); Anthony J. Sanchez, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/145,750

(22) Filed: Sep. 28, 2018

(51) Int. Cl.
*G06F 1/16* (2006.01)
(52) U.S. Cl.
CPC .......... *G06F 1/1618* (2013.01); *G06F 1/1681* (2013.01); *G06F 2200/1634* (2013.01)
(58) Field of Classification Search
CPC combination set(s) only.
See application file for complete search history.

(56) References Cited

U.S. PATENT DOCUMENTS

| | | | |
|---|---|---|---|
| 6,154,359 A | 11/2000 | Kamikakai et al. | |
| 6,831,229 B1 * | 12/2004 | Maatta | G06F 1/1616 174/50 |
| 6,930,881 B2 * | 8/2005 | Karidis | G06F 1/1616 16/286 |
| 8,520,382 B2 * | 8/2013 | Tye | G06F 1/203 248/685 |
| 8,693,181 B2 * | 4/2014 | Tseng | G06F 1/1635 312/223.1 |
| 8,976,524 B2 * | 3/2015 | Wang | H05K 5/0213 165/104.33 |
| 9,122,455 B2 | 9/2015 | Meyers | |
| 9,354,669 B2 * | 5/2016 | Chen | G06F 1/1681 |
| 9,582,048 B2 * | 2/2017 | Ho | G06F 1/1616 |
| 9,740,253 B2 * | 8/2017 | Cheng | G06F 1/203 |
| 9,933,813 B2 * | 4/2018 | Ohishi | G06F 1/1618 |

(Continued)

OTHER PUBLICATIONS

Asus Zenbook Flip S UX370UA, 2-in-1 PCs, Asus Global, Printed from Internet Jul. 24, 2018, 15 pgs.

(Continued)

*Primary Examiner* — Lisa Lea-Edmonds
(74) *Attorney, Agent, or Firm* — Egan Peterman Enders Huston

(57) ABSTRACT

A hinge assembly for a portable information handling system (IHS) includes an upper hinge axle coupled to a lid of the portable IHS, a lower hinge axle coupled to a base of the portable IHS, and a hinge cover encompassing the upper and lower hinge axles. A fulcrum foot provided on the hinge cover contacts a support surface when the lid is rotated to a first usage angle, and continues to support the portable IHS on the support surface as the lid is rotated further through a wide range of usage angles. When the lid is rotated beyond the first usage angle, a rear portion of the base lifts away from the support surface, and conceals an increasing greater portion of a lower bezel surrounding a display screen of the portable IHS. To reduce the amount of lift, internal components of the hinge assembly are offset by an angle θ of about 10°-20° from a vertical axis.

20 Claims, 12 Drawing Sheets

(56) References Cited

U.S. PATENT DOCUMENTS

| | | | |
|---|---|---|---|
| 2015/0227168 A1* | 8/2015 | Nakamura | G06F 1/1616 361/679.55 |
| 2015/0309539 A1 | 10/2015 | Kamphusi et al. | |
| 2015/0362958 A1* | 12/2015 | Shang | G06F 1/1681 361/679.58 |
| 2016/0010374 A1* | 1/2016 | Hsu | G06F 1/16 74/414 |
| 2016/0083988 A1* | 3/2016 | Hsu | G06F 1/1681 361/679.01 |

OTHER PUBLICATIONS

Bade, "Asus Zenbook Flip S UX370UA (i5, 256GB, FHD) Convertible Review", 2017, 16 pgs.
CNET, Ackerman, Asus ZenBook Flip S Review: A Slim Hybrid Packed With Extras, Oct. 2017, 5 pgs.
BusinessWire, "Asus Unveils Award-Winning ZenBook S (UX391)", Jun. 2018, 7 pgs.
Casey, "Dell Latitude 7490 Review", Full Review and Benchmarks, Apr. 2018, 17 pgs.
Spoonauer, Dell XPS 13 2-in-1 (2017) Review, Jan. 2017, 19 pgs.
CNET, Ackerman, "Asus ZenBook Flip S Review: A Slim Hybrid Packed With Extras", (p. 2), 2017, 4 pgs.
Asus Transformer Book Flip TP500LA/LN Review, printed from Internet Nov. 20, 2018, 46 pgs.

* cited by examiner

LEANED AXIS, ASYNCHRONOUS, DUAL-AXLE DROP HINGE AND PORTABLE INFORMATION HANDLING SYSTEM COMPRISING THE SAME

FIELD

This invention relates generally to information handling systems (IHSs), and more particularly, to a hinge assembly rotationally coupled between a lid and a base of the portable IHS.

BACKGROUND

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems, such as laptop computers and 2-in-1 computers, may generally comprise a lid (or display portion) which is rotationally coupled to a base (or main chassis portion) of the IHS. In a traditional clamshell configuration, the lid is rotationally coupled to the base, so that the lid articulates between a closed position (approximately 0°) to a variety of open positions or usage angles. For example, the lid may be rotated from the closed position to a variety of usage angles (e.g., between approximately 90°-120°) to expose a display screen of the IHS to the user. In some clamshell configurations, the lid may be rotated to a fully open position of approximately 180°. The lid may be rotated back to the closed position to enhance portability of the IHS. In most cases, one or more single-axle hinges may be coupled between the lid and the base on a rear surface of the IHS to provide the articulation desired in the clamshell configuration.

Although conventional clamshell configurations provide ease of use and convenience, the lid generally does not offer a firm enough platform for accepting touchscreen inputs. For this and other reasons, some portable information handling systems that include a touchscreen display in an articulating lid may be configured to rotate to a tablet-style configuration. In a tablet-style configuration, the lid is rotationally coupled to the base, so that the lid articulates approximately 360° from the closed position to the fully open position. In the fully open position, the top side of the lid is supported on the bottom side of the base and the display screen is exposed (like a tablet) for receiving touchscreen input. Supporting the top side of the lid on the bottom side of the base improves stability of the lid when receiving touchscreen input. Due to the greater rotational angle, tablet-style configurations may include one or more dual-axle hinges between the lid and the base on a rear surface of the IHS to provide the desired articulation.

FIGS. 1(A)-(C) and FIGS. 2(A)-(C) illustrate examples of two different types of dual-axle hinges that are often used in portable information handling systems having a tablet-style configuration (often referred to as 2-in-1 computers). In the portable IHSs 10/20 shown in FIGS. 1(A)-(C) and FIGS. 2(A)-(C), a dual-axle hinge assembly 16/26 is coupled between the lid 12 and base 14 of the portable IHS on a rear surface of the IHS. The dual-axle hinge assembly 16/26 includes a pair of hinge axles, denoted hinge axle A and hinge axle B, which are stacked one on top of the other along a vertical axis (denoted 0°). Hinge axle A is coupled to lid 12 and hinge axle B is coupled to base 14 of information handling systems 10/20.

In the IHS 10 shown in FIGS. 1(A)-(C), a synchronous dual-axle hinge assembly 16 (otherwise referred to as a synchronous hinge) is rotationally coupled between the lid 12 and the base 14. In synchronous hinges, the hinge axles A and B rotate synchronously (i.e., with the same rotation speed and angle) when the lid 12 is rotated from the closed position (approximately 0°) shown in FIG. 1(A) through a variety of usage angles to the fully open position (approximately 360°) shown in FIG. 1(C).

In the IHS 20 shown in FIGS. 2(A)-(C), an asynchronous dual-axle hinge assembly 26 (otherwise referred to as an asynchronous tower hinge) is rotationally coupled between the lid 12 and the base 14. In the asynchronous dual-axle hinge assembly 26 shown in FIGS. 2(A)-(C), the upper hinge axle A rotates first when the lid 12 is rotated from the closed position (approximately 0°) shown in FIG. 2(A) to approximately 180° before the lower hinge axle B engages and continues the rotation to the fully open position (approximately 360°) shown in FIG. 2(C).

In some portable IHSs, it may be desirable to reduce the appearance of the display screen bezel width on all four sides of the display screen to provide a "narrow" bezel or "infinity" bezel appearance. The hinge assemblies 16/26 shown in FIGS. 1(A)-(C) and FIGS. 2(A)-(C) cannot be used to provide a "narrow" bezel or "infinity" bezel appearance.

SUMMARY OF THE INVENTION

The following description of various embodiments of hinge assemblies and information handling systems comprising such hinge assemblies is not to be construed in any way as limiting the subject matter of the appended claims.

According to one embodiment, a hinge assembly in accordance with the present disclosure may be rotationally coupled between a lid and a base of a portable information handling system (IHS). The disclosed hinge assembly may generally include an upper hinge axle coupled to the lid of the portable IHS, a lower hinge axle coupled to the base of the portable IHS, a hinge cover encompassing the upper and lower hinge axles, and a fulcrum foot provided on the hinge cover.

The upper and lower hinge axles included within the disclosed hinge assembly are configured to rotate asynchronously, or sequentially, one after the other. Specifically, the lower hinge axle may be configured to rotate first, while the upper hinge axle remains stationary, when the lid is rotated from a closed position to a usage angle of approximately 180°. The upper hinge axle may be configured to rotate, while the lower hinge axle remains stationary, when the lid is rotated between approximately 180° and approximately 360°. Configuring the lower hinge axle to rotate first, while the upper hinge axle remains stationary, causes an upper edge of the hinge assembly to drop down below a lower surface of the base.

Due to the drop down configuration of the disclosed hinge assembly, the upper edge of the hinge cover may contact a support surface, and a rear portion of the base may lift away from the support surface, when the lid is rotated beyond a first usage angle of 100° to 120°. To reduce the amount by which the rear portion of the base lifts away from the support surface, the upper and lower hinge axles of the disclosed hinge assembly are leaned, or offset, by an angle θ of approximately 10°-20° from a vertical axis. Accordingly, the hinge assembly disclosed herein may be described as a leaned axis, asynchronous, dual-axle drop hinge assembly.

According to one embodiment, the leaned axis, asynchronous, dual-axle drop hinge assembly disclosed herein may generally include a lower torque engine, an upper torque engine, a switching mechanism, a lower axle mounting feature, and an upper axle mounting feature. The lower torque engine may include the lower hinge axle and a lower variable torque mechanism that adjusts an amount of friction applied to the lower hinge axle as the lid is rotated from about 0° to about 180°. The upper torque engine may include the upper hinge axle and an upper variable torque mechanism that adjusts an amount of friction applied to the upper hinge axle as the lid is rotated from about 180° to about 360°. The switching mechanism may be coupled to switch rotation from the lower torque engine to the upper torque engine when the lid is rotated beyond approximately 180°. The lower axle mounting feature may be coupled between the lower hinge axle and a lower mounting bracket of the hinge assembly, and the upper axle mounting feature may be coupled between the upper hinge axle and an upper mounting bracket of the hinge assembly. In some embodiments, the upper and lower torque engines, the switching mechanism, and the upper and lower axle mounting features may each be shifted by the offset angle θ to reduce the amount by which the rear portion of the base lifts away from the support surface when the lid is rotated beyond the first usage angle.

In some embodiments, the fulcrum foot provided on the hinge cover may contact the support surface when the lid is rotated to the first usage angle, and may continue to support the portable IHS on the support surface as the lid is rotated further through a wide range of usage angles. In some embodiments, the fulcrum foot may initially contact the support surface when the lid is rotated to a first usage angle between approximately 100° and 120°, and may remain in contact with the support surface as the lid is rotated through a wide range of usage angles between about 110° and about 160°. In some embodiments, the fulcrum foot may remain in contact with the support surface as the lid is rotated further to about 180°.

In some embodiments, the fulcrum foot may be arranged near an upper edge of the hinge cover and may extend substantially across an entire length of the hinge cover. In other embodiments, the fulcrum foot may extend substantially across an entire width of the hinge cover and may wrap around an upper edge of the hinge cover. In some embodiments, a portion of the fulcrum foot may be recessed within a mating groove formed within the hinge cover. In some embodiments, the fulcrum foot may comprise an elastomeric material.

According to another embodiment, a portable information handling system (IHS) comprising a leaned axis, asynchronous, dual-axle drop hinge is disclosed herein. The portable IHS may generally include a lid including a display screen, a base including a main chassis, and a hinge assembly rotationally coupled between the lid and the base. As noted above, the hinge assembly disclosed herein may include an upper hinge axle coupled to the lid, a lower hinge axle coupled to the base, and a hinge cover encompassing the upper and lower hinge axles. The upper and lower hinge axles may be configured to rotate asynchronously, or sequentially, as described above.

In some embodiments, the hinge cover may contact the support surface when the lid is rotated to a first usage angle (e.g., an angle between about 100° and 120°). In other embodiments, a fulcrum foot provided on the hinge cover may contact the support surface when the lid is rotated to the first usage angle, and may continue to support the portable IHS on the support surface as the lid is rotated further through a wide range of usage angles. The fulcrum foot may be generally configured as described above.

In some embodiments, the hinge assembly disclosed herein may reduce the appearance of the display screen bezel height in a lower portion of the display screen. For example, the disclosed hinge assembly may cause a rear portion of the base to lift away from the support surface and conceal an increasing greater portion of a lower bezel surrounding the display screen when the lid is rotated beyond the first usage angle.

In some embodiments, it may be desirable to reduce an amount by which the rear portion of the base lifts away from the support surface when the lid is rotated beyond the first usage angle. To reduce or minimize the lift, one or more internal components of the disclosed hinge assembly may be leaned, or offset, by an offset angle θ of approximately 10°-20° from a vertical axis. For example, the hinge assembly disclosed herein may generally include a lower torque engine, an upper torque engine, a switching mechanism, a lower axle mounting feature, and an upper axle mounting feature, as described above. In some embodiments, the upper and lower torque engines, the switching mechanism, and the upper and lower axle mounting features may each be shifted by the offset angle θ to reduce the amount by which the rear portion of the base lifts away from the support surface when the lid is rotated beyond the first usage angle.

BRIEF DESCRIPTION OF THE DRAWINGS

Other advantages of the present disclosure will become apparent upon reading the following detailed description and upon reference to the accompanying drawings in which.

Figure 1A:
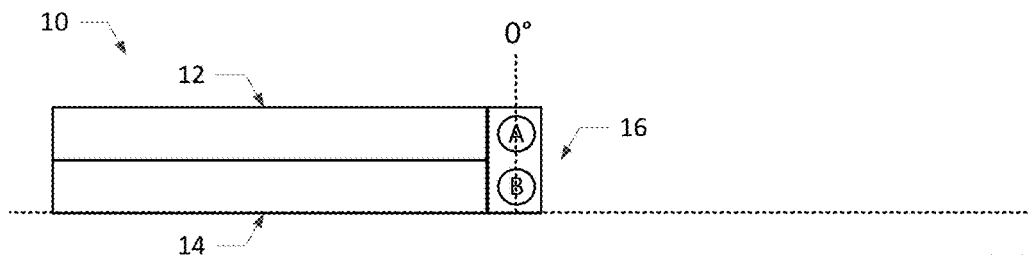
FIGS. 1(A)-(C) (Prior Art) are block diagrams of a portable information handling system (IHS) having a synchronous dual-axle hinge assembly coupled between a lid and a base of the portable IHS.
Figure 1B:
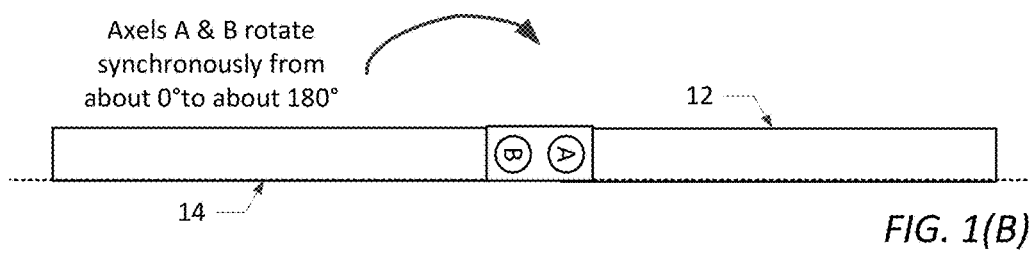
Figure 1C:
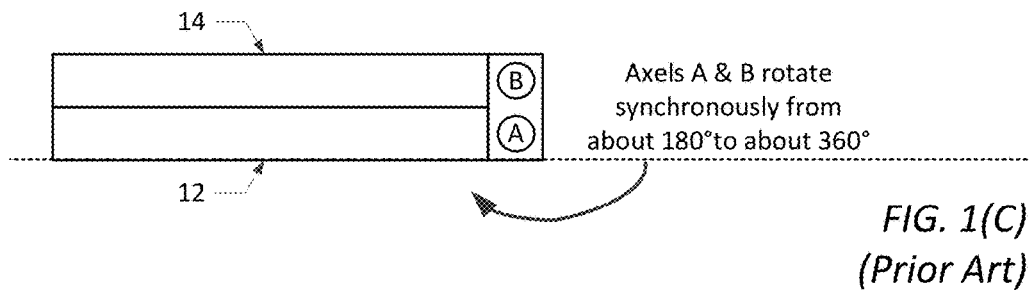

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a peripheral device (e.g., a printer), a network storage device, or any other suitable device and may vary in size, shape, performance, functionality, and price. In some embodiments, an information handling system may include random access memory (RAM), one or more processing resources such as a central processing unit (CPU) or hardware or software control logic, read only memory (ROM), and/or other types of nonvolatile memory. In some embodiments, an information handling system may also include one or more disk drives, one or more network ports for communicating with external devices, and/or various input and output (I/O) devices, such as a keyboard, a mouse, a touch screen and/or a video display. An information handling system may also include one or more buses operable to transmit communications between the various hardware components contained therein.

Some portable information handling systems, such as laptop computers and 2-in-1 computers, are designed with a narrow border, or bezel, around at least two sides of the display screen (e.g., a liquid crystal display (LCD) screen or LCD touchscreen). Due to the underlying electronic circuits typically provided in the upper and lower portions of the display screen (e.g., cameras, routing traces and associated touchscreen circuitry, etc.), the width of the display screen bezel in the upper and lower portions of the display screen is generally larger than the width of the display screen bezel on the left and right sides of the display screen. In some systems, it has become desirable to reduce the appearance of the display screen bezel width on all four sides of the display screen.

FIGS. 3(A)-(D) illustrate one embodiment of a portable information handling system (IHS) 30 having a dual-axle hinge assembly, which reduces the appearance of the display screen bezel width in at least a lower portion of the display screen. As shown in FIGS. 3(A)-(D), portable IHS 30 generally includes a lid 32 including a display screen portion of the IHS, a base 34 including a main chassis portion of the IHS, and a dual-axle hinge assembly 36 rotationally coupled between the lid and the base on a rear surface of the IHS. The dual-axle hinge assembly 36 includes a pair of hinge axles, denoted hinge axle A and hinge axle B. The upper hinge axle A is coupled to lid 32 and the lower hinge axle B is coupled to base 34 of IHS 30. The upper and lower hinge axles A and B rotate asynchronously, or sequentially, when lid 32 is opened from the closed position shown in FIG. 3(A) to the fully open position shown in FIG. 3(D).

Figure 2A:
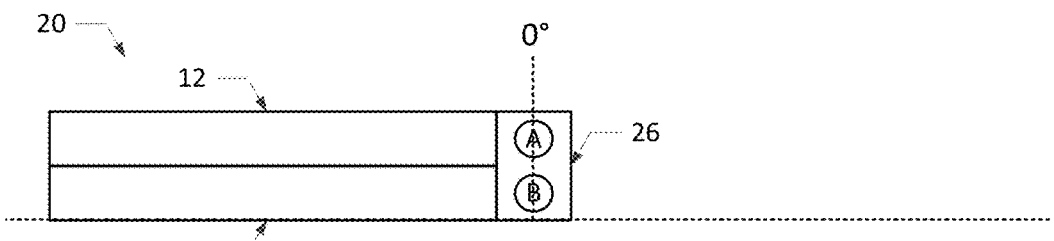
FIGS. 2(A)-(C) (Prior Art) are block diagrams of a portable IHS having an asynchronous dual-axle hinge assembly coupled between a lid and a base of the portable IHS.
Figure 2B:
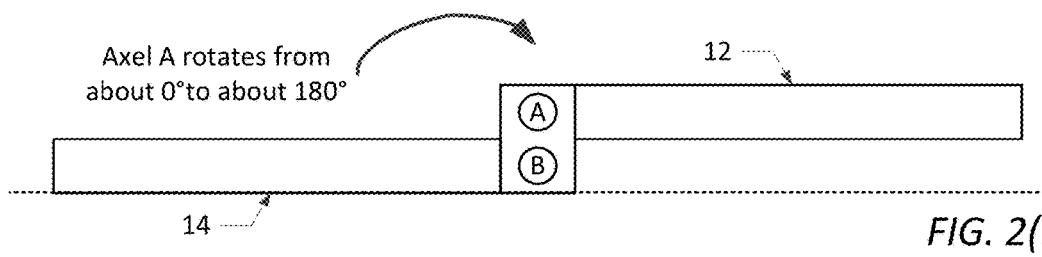
Figure 2C:
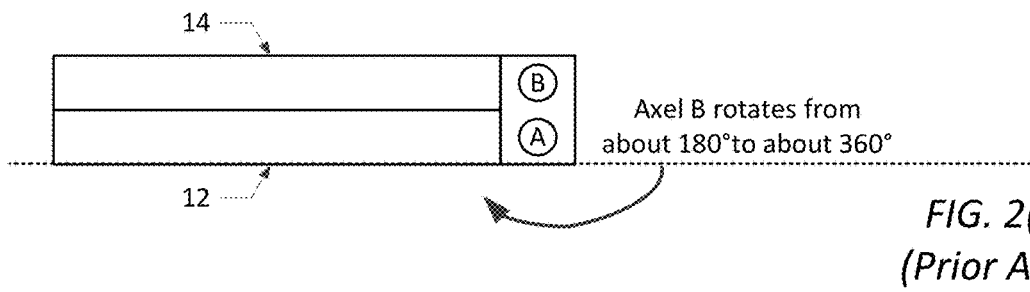
Figure 3A:
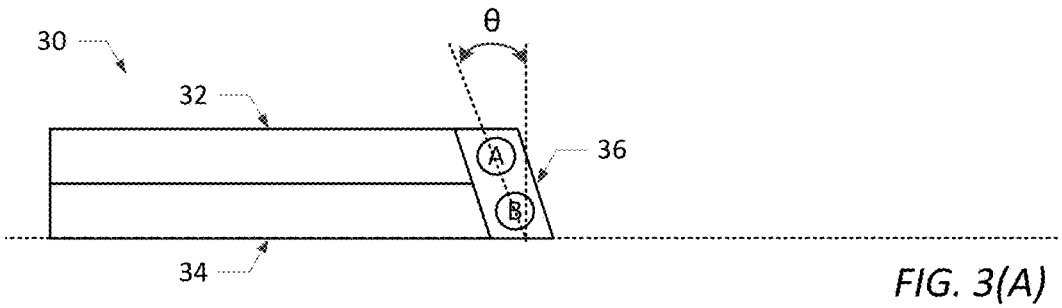
FIGS. 3(A)-(D) are block diagrams of a portable IHS having a leaned axis, asynchronous dual-axle drop hinge assembly coupled between a lid and a base of the portable IHS, according to one embodiment of the present disclosure.
Figure 3B:
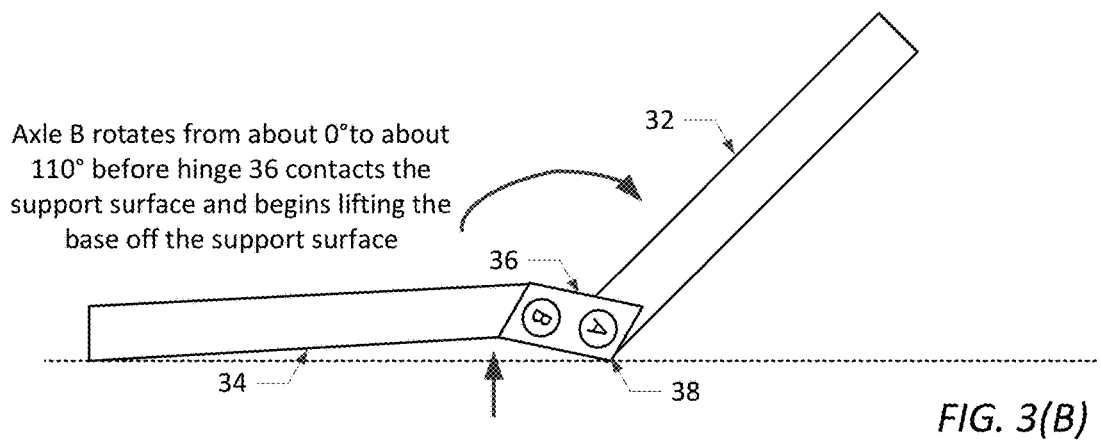
Figure 3C:
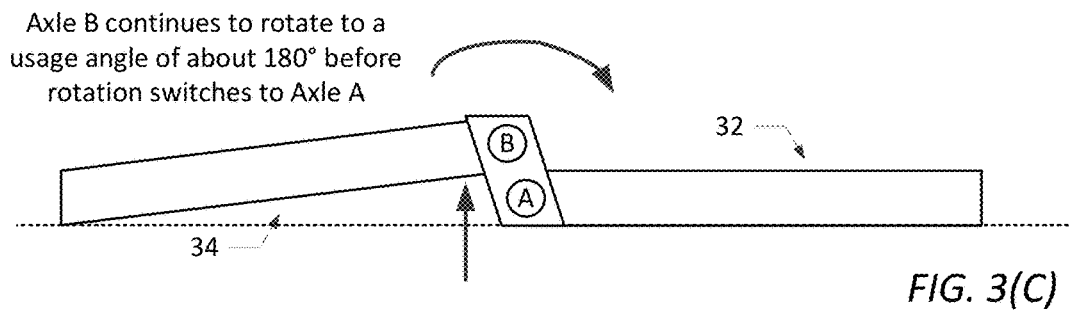
Figure 3D:
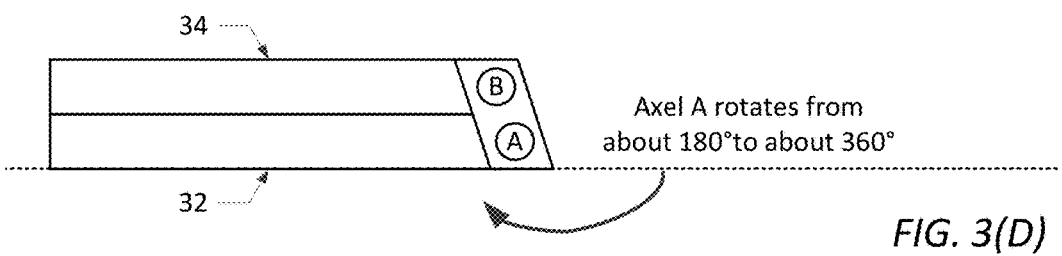

Unlike the asynchronous tower hinge shown in FIG. 2, the asynchronous dual-axle hinge assembly 36 shown in FIGS. 3(A)-(D) is preferably configured as a "drop hinge." In a drop hinge configuration, the lower hinge axle B rotates first, while the upper hinge axle A remains stationary, when lid 32 is rotated from the closed position (approximately 0°) shown in FIG. 3(A) to the substantially flat position (approximately) 180° shown in FIG. 3(C). When lid 32 is rotated beyond approximately 180°, rotation switches to the upper hinge axle A, which continues the rotation to the fully open position (approximately 360°) shown in FIG. 3(D).

As shown in FIG. 3(B), an upper edge 38 of the asynchronous dual-axle drop hinge assembly 36 may come in contact with the table (or other support surface upon which the IHS rests) when the lid 32 is rotated to a certain usage angle. In one embodiment, the upper edge 38 of hinge assembly 36 may contact the support surface when lid 32 is rotated to a usage angle of approximately 100°-120°. In one particular implementation, the upper edge 38 of the hinge assembly 36 may contact the support surface when lid 32 is rotated to a usage angle of approximately 110°. Once hinge assembly 36 contacts the support surface, further rotation of the lower hinge axle B causes a rear portion of the base 34 to lift away from the support surface. As the rear portion of the base 34 lifts, it conceals an increasingly greater portion of the lower display screen bezel from the user's view, thereby further reducing the appearance of the lower display screen bezel width over a range of usage angles (e.g., approximately 110°-160°). A maximum distance between the rear portion of the base 34 and the support surface occurs in FIG. 3(C) when the lower hinge axle B is rotated to its maximum extent.

As shown in FIG. 3(A), the upper and lower hinge axles A and B are leaned or offset by an angle θ from the vertical axis. The offset angle, θ, reduces the hinge lift effect on the base 34 over a range usage angles to thereby decrease the distance that the rear portion of the base 34 is lifted away from the support surface. In one embodiment, the upper and lower hinge axles A and B may be leaned, or offset, by an angle θ of approximately 10°-20° from the vertical axis, thereby providing a leaned axis, asynchronous dual-axle drop hinge assembly 36. Although not limited to such, the upper and lower hinge axles A and B may be offset by an angle θ of approximately 15°, 16°, or 17° from the vertical axis, in one or more example embodiments.

The offset angle θ advantageously increases the usage angle at which the upper edge 38 of the hinge assembly 36 initially contacts the support surface. In one example implementation, the upper edge 38 of the hinge assembly 36 may initially contact the support surface when the lid 32 is rotated to a usage angle of approximately 110°. In comparison, if the upper and lower hinge axles were instead stacked along the vertical axis (at 0°) in an alternative hinge assembly, the upper edge of the alternative hinge assembly would initially contact the support surface when the lid is rotated to a usage angle of approximately 95°. Configuring hinge assembly 36 with an offset angle θ of approximately 10°-20° may, therefore, improve stability of the lid 32 at a more desirable usage angle (e.g., a usage angle of approximately 110° vs. approximately 95°).

When lid 32 is rotated beyond the usage angle at which the upper edge 38 of the hinge assembly 36 initially contacts the support surface, the rear portion of the base 34 lifts further away from the support surface until the lid 32 is rotated to the substantially flat position shown in FIG. 3(C). As the rear portion of the base 34 lifts, it conceals an increasingly greater portion of the lower display screen bezel from the user's view. This provides the advantage of reducing the appearance of the lower display screen bezel width over a wide range of usage angles (e.g., approximately 110°-160°), which as noted above, may be desirable in some portable information handling systems.

In some embodiments, a particular offset angle θ may be chosen to optimize the drop-down effect provided by hinge assembly 36 (i.e., concealing a lower portion of the display screen bezel), while keeping the base 34 of the IHS 30 as close as possible to the support surface. In general, the larger the offset angle θ, the less the rear portion of the base 34 may be lifted away from the support surface as the lid 32 is rotated.

In some embodiments, portable IHS 30 may have an air exhaust vent on a rear side, and an air intake vent on an underside, of the base 34. By configuring hinge assembly 36 with an offset angle θ, which reduces table lift and keeps base 34 as close as possible to the support surface, the amount of hot exhaust air coming back into the air intake vent on the underside is reduced. For example, hinge assembly 36 may be configured with an offset angle θ of approximately 17°. When configured with such an offset angle, hinge assembly 36 may cause a rear portion of the base 34 to lift only about 2 mm away from the support surface when the lid 32 is rotated to a usage angle of about 130°. In comparison, if the upper and lower hinge axles were instead stacked along the vertical axis (0°) in an alternative hinge assembly, the rear portion of the base would lift about 4 mm away from the support surface when the lid is rotated 130°. The 2 mm table lift reduction provided by hinge assembly 36 helps to reduce the amount of hot exhaust air coming back into the air intake vent on the underside of the base 34.

Compared to prior art hinge assemblies, the leaned axis, asynchronous dual-axle drop hinge assembly 36 shown in FIGS. 3(A)-(D) visually reduces the amount of the lower display screen bezel seen by the user at various usage angles (e.g., approximately 110°-160°), provides greater stability to the lid 32 at a more desirable usage angle (e.g., a usage angle of approximately 110° vs. approximately 95°), and improves thermal characteristics of the information handling system by reducing the amount of table lift, and thus, the amount of hot exhaust air coming back into the system from the underside.

Figure 4:
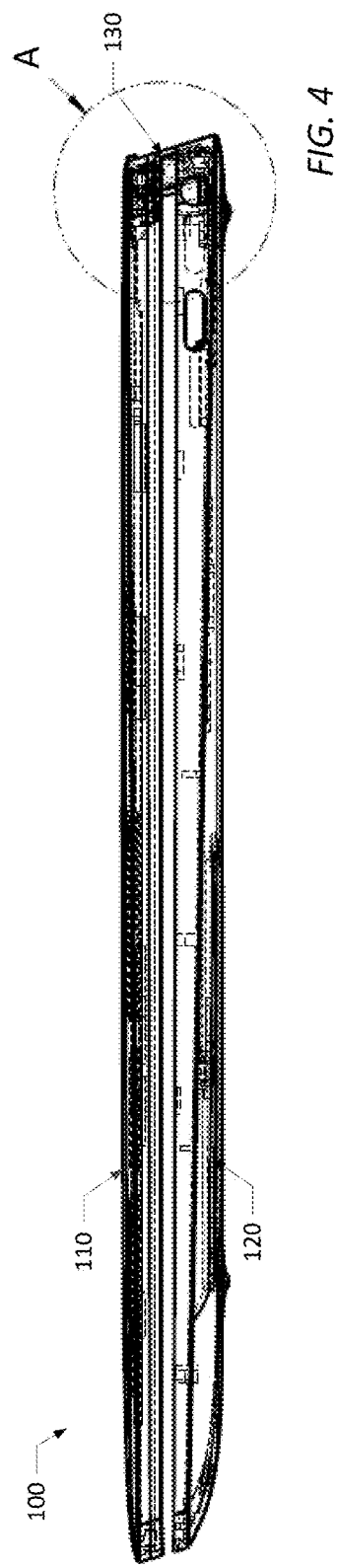
FIG. 4 is a side view of a portable IHS having a leaned axis, asynchronous dual-axle drop hinge assembly, according to one embodiment of the present disclosure.
Figure 5:
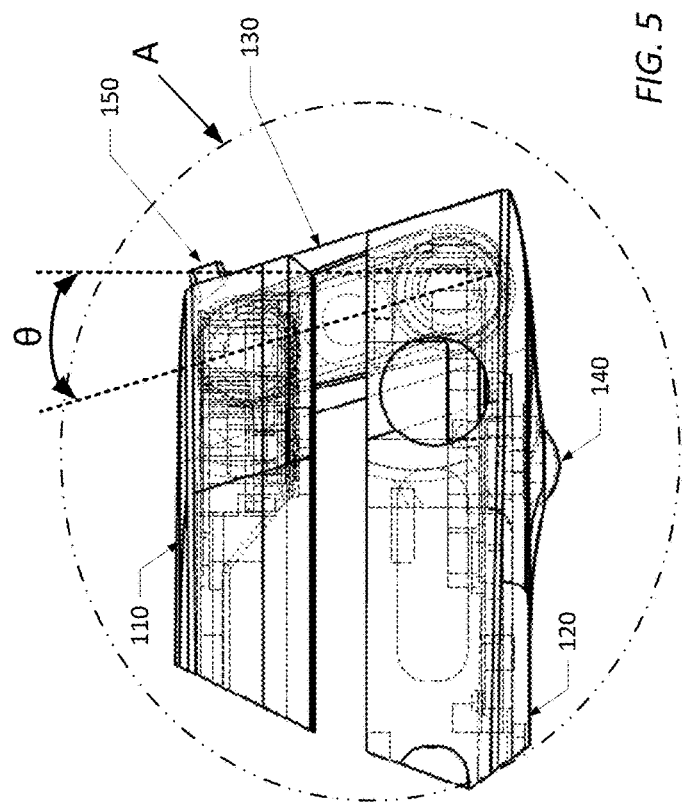
FIG. 5 is a magnified view of a rear portion of the portable IHS shown in FIG. 4 demonstrating the offset angle θ of the leaned axis, asynchronous dual-axle drop hinge assembly.

Example implementations of portable IHS having a leaned axis, asynchronous dual-axle drop hinge assembly are shown in FIGS. 4-13 and described in more detail below. For example, FIG. 4 is a side view illustrating one embodiment of a portable IHS 100, which may include at least one leaned axis, asynchronous dual-axle drop hinge assembly 130 in accordance with the present disclosure. FIG. 5 is a magnified view of a rear portion of the portable IHS 100 shown in FIG. 4 illustrating how the upper and lower axles of hinge assembly 130 may be leaned, or offset, by an angle θ from the vertical axis. It is noted, that although the hinge assembly 130 disclosed herein is implemented within a particular information handling system (e.g., a 2-in-1 computer provided by Dell Inc. of Round Rock, Tex.), the disclosed hinge assembly is not limited to such an implementation, and may be alternatively implemented within other information handling systems that enable a lid to rotate approximately 360° from a closed position to a fully open position.

As shown in FIG. 4, portable IHS 100 includes at least one leaned axis, asynchronous dual-axle drop hinge assembly 130, which is rotationally coupled between a lid 110 and a base 120 of the portable IHS. In some embodiments, portable IHS 100 may include a pair of hinge assemblies 130, each rotationally coupled between the lid 110 and the base 120. Portable IHS 100 may also include one or more feet 140, which are located on an underside of the base 120 and configured to support the base on a table (or other support surface) when the IHS is placed on the support surface. As described in more detail below, a fulcrum foot 150 may be provided on hinge assembly 130 to improve stability between the hinge assembly and the support surface when lid 110 is rotated to the point where the upper edge of the hinge assembly contacts and rests upon the support surface.

As shown in the magnified view of FIG. 5, hinge assembly 130 may be coupled to the chassis or housing of portable IHS 100 within both lid 110 and base 120. Mounting brackets for attaching hinge assembly 130 to the IHS 100 are shown in FIGS. 7-10 and described in more detail below. As noted above with regard to FIGS. 3(A)-(D), hinge assembly 130 may include upper and lower hinge axles A and B, which are offset by an angle θ of approximately 10°-20° from the vertical axis. In some embodiments, a particular offset angle θ may be chosen to reduce the appearance of the lower display screen bezel width seen by the user at various usage angles (e.g., approximately 110°-160°), provide greater stability to the lid 110 at a more desirable usage angle (e.g., a usage angle of approximately 110° vs. approximately 95°), and improve thermal characteristics of the IHS 100 by reducing table lift and decreasing the amount of hot exhaust air coming back into the system from the underside. In one example embodiment, hinge assembly 130 may be implemented with an offset angle θ of approximately 17° to provide these and potentially other advantages.

Figure 6A:
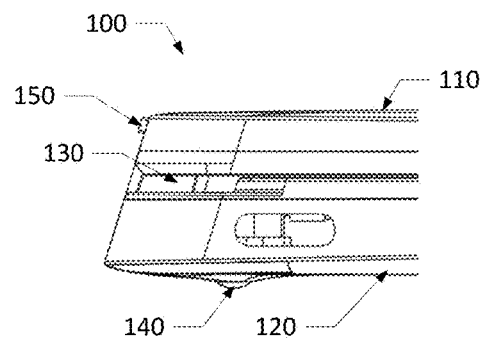
FIGS. 6(A)-(H) are side views of a rear portion of the portable IHS shown in FIG. 4 as the lid of the IHS is rotated through a variety of usage angles, illustrating the corresponding amount of table lift provided by the leaned axis, asynchronous dual-axle drop hinge assembly at each progressive usage angle.
Figure 6B:
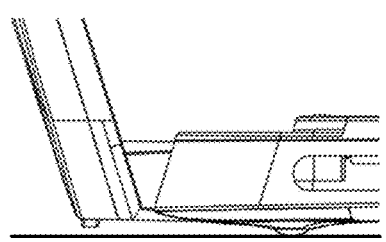
Figure 6I:
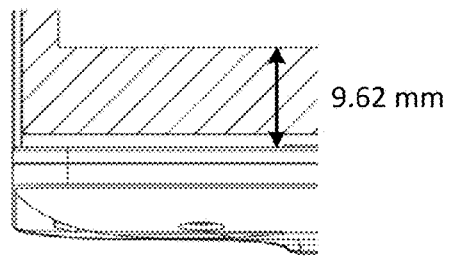
FIGS. 6(I)-(N) are front views of a portion of the portable IHS shown in FIG. 4 as the lid of the IHS is rotated through a variety of usage angles, illustrating the apparent display screen bezel width reduction provided by the leaned axis, asynchronous daul-axle drop hinge assembly at each progressive usage angle.
Figure 6C:
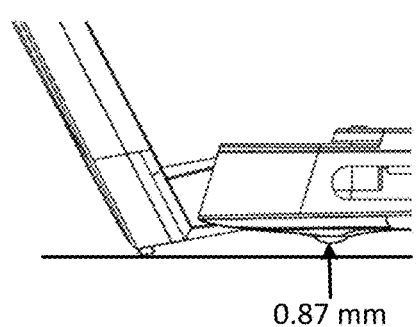
Figure 6J:
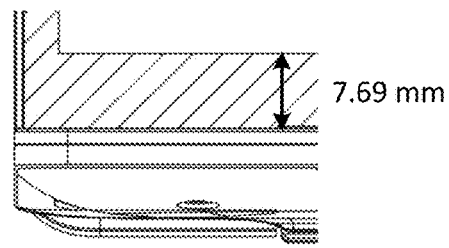
Figure 6D:
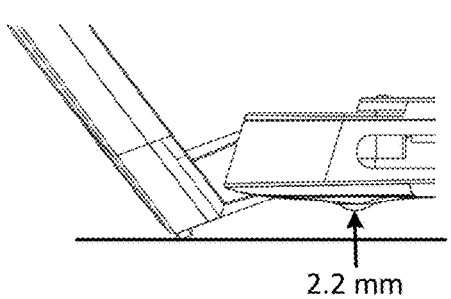
Figure 6K:
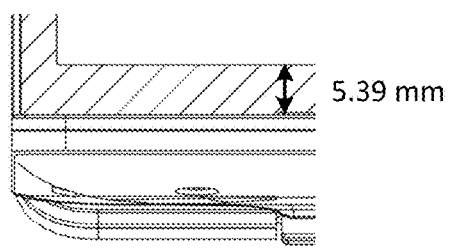
Figure 6E:
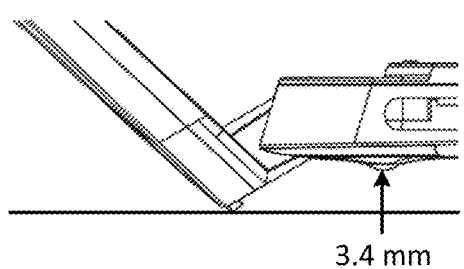
Figure 6L:
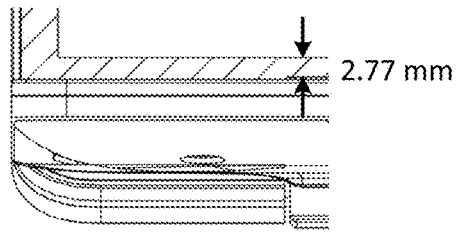
Figure 6F:
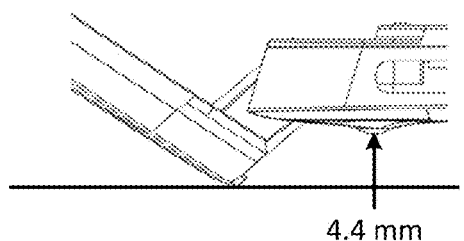
Figure 6M:
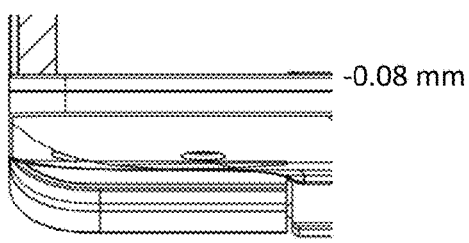
Figure 6G:
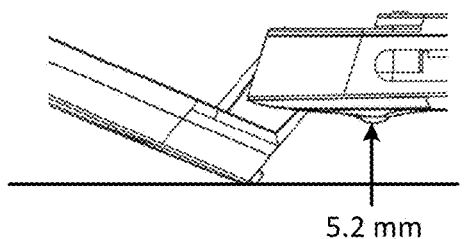
Figure 6N:
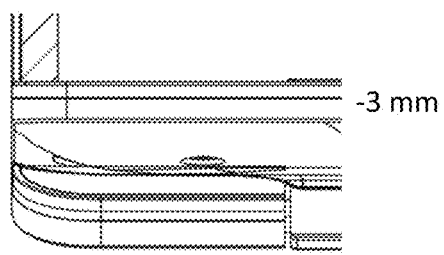

FIGS. 6(A)-(N) provide side and front views of a portion of IHS 100 as lid 110 is rotated through a variety of usage angles and the corresponding amount of table lift (shown, e.g., in FIGS. 6(A)-(H)) and apparent display screen bezel width reduction (shown, e.g., in FIGS. 6(I)-(N)) provided by hinge assembly 130 at each progressive usage angle. A side view of a rear portion of IHS 100 is illustrated in a closed position in FIG. 6(A). In FIGS. 6(B) and 6(I), lid 110 is lifted and rotated to a usage angle of 107° to present the display screen to the user. In one embodiment, approximately 9.62 mm of the lower display screen bezel may be visible to the user (see FIG. 6(I)) when the lid is rotated to a usage angle of 107°. In some embodiments, the fulcrum foot 150 provided on hinge assembly 130 may initially contact the support surface when the lid is rotated to a usage angle of about 110°, and may continue to support the IHS 100 on the support surface as the lid is rotated further through a wide range of usage angles (e.g., approximately 110°-160°, in one embodiment). As shown in FIGS. 11-13 and described in more detail below, fulcrum foot 150 may be arranged on the hinge assembly 130 and configured to improve stability of the IHS 100 over a wide range of usage angles.

Figure 6H:
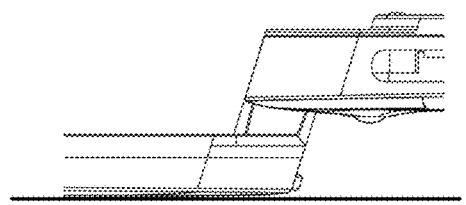

When lid 110 is rotated to a usage angle of 117° in FIGS. 6(C) and 6(J), the foot 140 provided on the underside of base 120 raises about 0.87 mm away from the support surface and approximately 7.69 mm of the lower display screen bezel is visible to the user. As shown in FIGS. 6(D)-(G) and 6(K)-(N), further rotation of the lid 110 to larger usage angles, such as 127° in FIGS. 6(D) and 6(K), 137° in FIGS. 6(E) and 6(L), 147° in FIGS. 6(F) and 6(M), and 157° in FIGS. 6(G) and 6(N), gradually increases the distance between foot 140 and the support surface (e.g., to 2.2 mm, 3.4 mm, 4.4 mm, and 5.2 mm, respectively) and reduces the amount of lower display screen bezel visible to the user (e.g., to 5.39 mm, 2.7 mm, −0.08 mm, and −3 mm, respectively). In FIG. 6(H), lid 110 is rotated approximately 180° to the substantially flat position. In some embodiments (FIG. 13(A)), the top surface of the lid 110 may rest upon the support surface, and the IHS may no longer be supported by fulcrum foot 150, when the lid 110 is rotated approximately 180°. In other embodiments (FIG. 13(B)), fulcrum foot 150 may remain in contact with the support surface and continue to support the IHS even when the lid 110 is rotated approximately 180° to the substantially flat position.

FIGS. 7-13 illustrate various embodiments of the leaned axis, asynchronous dual-axle drop hinge assembly 130 disclosed herein. More specifically, FIGS. 7-10 illustrate various internal components of hinge assembly 130. FIGS. 11-13 illustrate various embodiments of a hinge cover (otherwise referred to as a hinge chassis or hinge knuckle), which encloses the internal components of hinge assembly 130 and comprises fulcrum foot 150.

Figure 7:
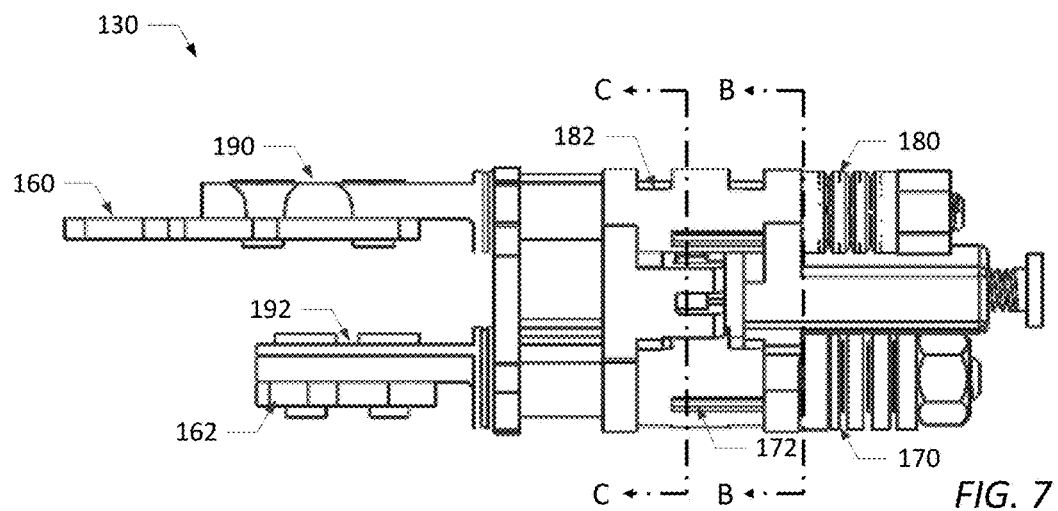
FIG. 7 is a rear view of internal components of the leaned axis, asynchronous dual-axle drop hinge assembly, according to one embodiment of the present disclosure.
Figure 8:
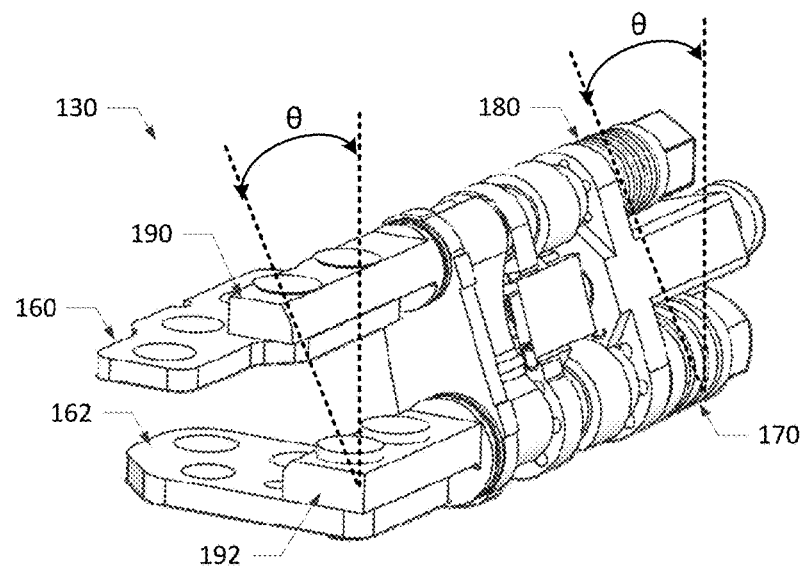
FIG. 8 is a side perspective view of the internal components of the leaned axis, asynchronous dual-axle drop hinge assembly shown in FIG. 7.

As shown in FIGS. 7-10, hinge assembly 130 may generally include a pair of mounting brackets 160/162, a lower torque engine 170, an upper torque engine 180, a pair of axle mounting features 190/192 and a switching mechanism 200. The upper and lower mounting brackets 160 and 162 are configured to secure hinge assembly 130 to coupling points within the lid 110 and base 120, respectively. The upper axle mounting feature 190 is coupled between upper hinge axle 182 and upper mounting bracket 160. The lower axle mounting feature 192 is coupled between lower hinge axle 172 and lower mounting bracket 162. As shown in FIG. 8, the upper and lower axle mounting features 190 and 192 may be shifted by the offset angle, θ, to provide the desired amount of lean.

The lower torque engine 170 includes a lower hinge axle 172 and a lower variable torque mechanism 174, which is configured to adjust the amount of friction applied to the lower hinge axle as the lid is rotated from about 0° to 180°. The upper torque engine 180 includes an upper hinge axle 182 and an upper torque mechanism 184, which applies friction to the upper hinge axle as the lid is rotated from about 180° to 360°. Switching mechanism 200 is coupled between the lower torque engine 170 and the upper torque engine 180 to switch from the lower torque engine to the upper torque engine when the lid is rotated beyond approximately 180°.

In some embodiments, lower hinge axle 172 may have a substantially larger diameter (e.g., 5.0 mm) than the diameter (e.g., 4.0 mm) of upper hinge axle 182 to provide greater amount of torque, and thus, increased stability to the lid 110 and display screen through a range of typical usage angles (e.g., approximately 0° to 130°). Although the smaller diameter of the upper hinge axle 182 provides substantially less torque, it is only active past usage angles of 180° and is not engaged as frequently as the lower hinge axle 172. As shown in more detail with regard to FIG. 11(C), the smaller diameter of the upper hinge axle 182 enables a thicker foot 150 geometry and deeper mating overlap between the fulcrum foot 150 and the hinge cover 210, in some embodiments.

Figure 9:
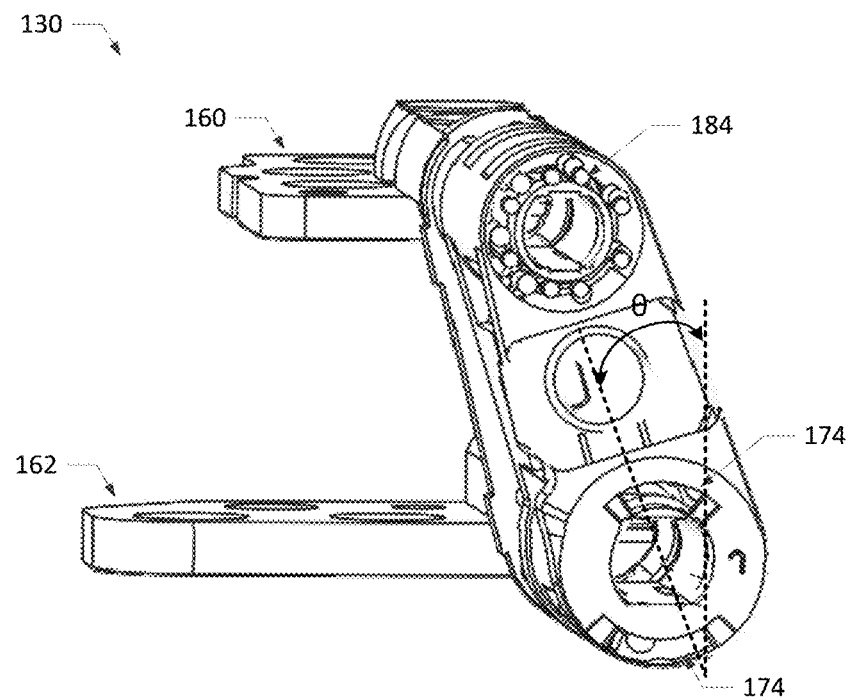
FIG. 9 is a cross-sectional view through the hinge assembly shown in FIG. 7 along line B-B.
Figure 10:
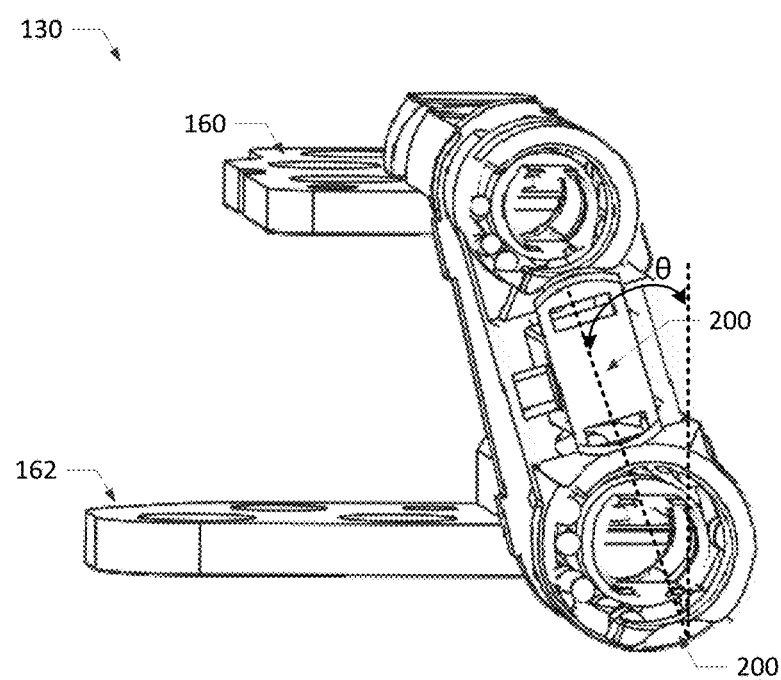
FIG. 10 is another cross-sectional view through the hinge assembly shown in FIG. 7 along line C-C.

FIGS. 9 and 10 illustrate cross-sectional views through the internal components of the hinge assembly 130 shown in FIG. 7. More specifically, FIG. 9 provides a cross-sectional view taken along lines B-B of FIG. 7 to illustrate the variable torque mechanism 184 included within lower torque engines 170. FIG. 10 provides a cross-sectional view taken along lines C-C of FIG. 7 to illustrate the switching mechanism 200 coupled between the upper and lower torque engines 180 and 170.

As shown in FIGS. 8-10, internal components of hinge assembly 130 may be offset by an angle θ from the vertical axis to provide the desired amount of lean. For example, the upper and lower axle mounting features 190 and 192, the upper and lower torque engines 180 and 170, and the switching mechanism 200 may each be shifted by the offset angle θ to provide the desired amount of lean. In one embodiment, the upper and lower axle mounting features 190 and 192, the upper and lower variable torque engines 180 and 170, and the switching mechanism 200 may each be shifted by approximately 17°. However, the offset angle is not limited to such an embodiment and may range from about 10° to about 20°, in other embodiments of the disclosed hinge assembly 130.

FIGS. 11(A)-(D) illustrate one embodiment of a fulcrum foot 150 that may be arranged near an upper edge 212 of hinge cover 210, according to one embodiment of the present disclosure. In the embodiment illustrated in FIGS.

11(A)-(D), fulcrum foot 150 is elongated and configured to extend substantially across the entire length of hinge cover 210. A mating groove 220 is formed near the upper edge 212 of hinge cover 210 and configured for receiving the fulcrum foot 150. In one embodiment, mating groove 220 may include holes for receiving pegs formed on an underside of fulcrum foot 150. In some embodiments, fulcrum foot 150 may be formed, at least in part, with an elastomeric material to enable zero gap mating fitment into hinge cover 210 and provide anti-slip functionality to the fulcrum foot. In some embodiments, the elastomeric material may be a rubber material. In other embodiments, the elastomeric material may be a silicon material, which is over-molded onto a plastic frame to reduce the thickness of the foot compared to a rubber foot. In some embodiments, a metal material (e.g., aluminum) may be used to form the hinge cover 210 and an appropriate epoxy may be used to bond fulcrum foot 150 to the mating groove 220 formed within the hinge cover.

Figure 11A:
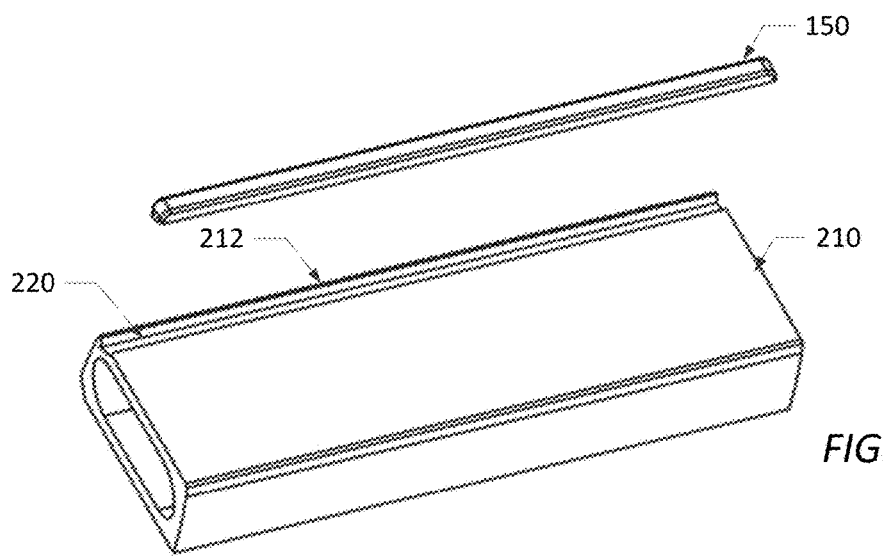
FIGS. 11(A)-(B) are rear perspective views illustrating one embodiment of a hinge cover, which may be used to enclose the internal components of the hinge assembly shown in FIGS. 7-10, and a fulcrum foot that may be arranged near an upper edge of the hinge cover, according to one embodiment of the present disclosure.
Figure 11B:
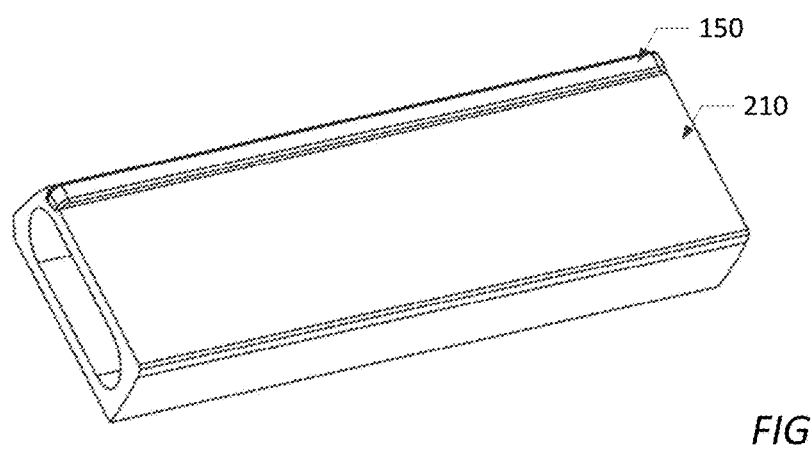
Figure 11C:
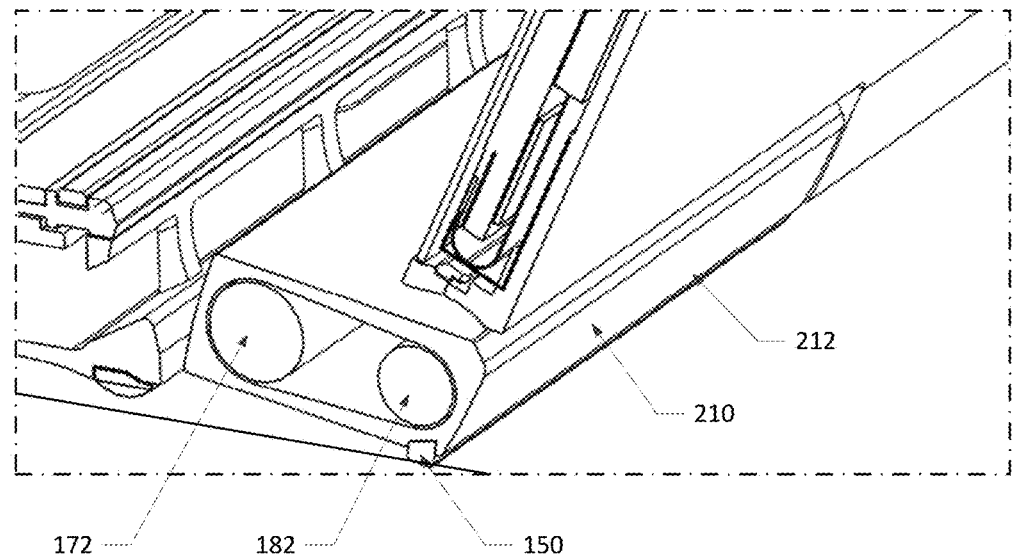
FIG. 11(C) is a cross-sectional view taken along a width of the hinge cover shown in FIGS. 11(A)-(B) near an outboard side of the hinge assembly.
Figure 11D:
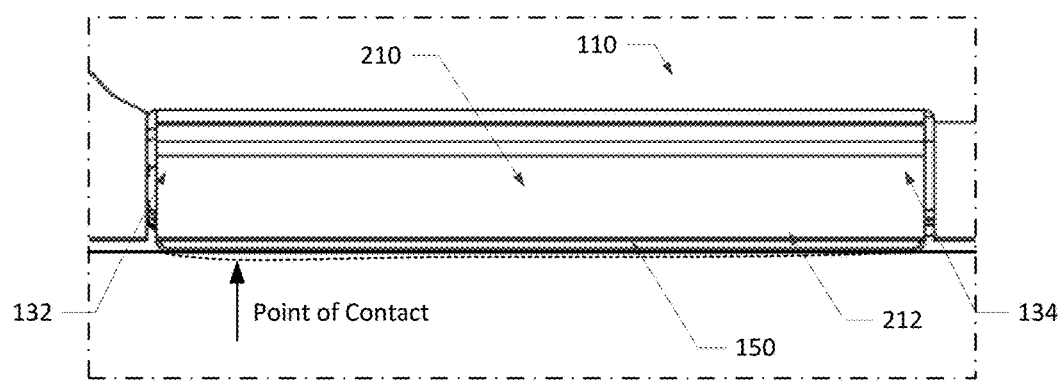
FIG. 11(D) is a rear view of the hinge cover shown in FIGS. 11(A)-(C)

FIG. 11(C) is a cross-sectional view taken along a width of hinge cover 210 near an outboard side of the hinge assembly 130. As shown in FIG. 11(C), placement of the fulcrum foot 150 near the upper edge 212 of the hinge cover 210 enables the hinge cover to support the information handling system on the support surface over a wide range of usage angles (e.g., approximately 110°-160°). FIG. 11(C) also illustrates how the smaller diameter of upper hinge axle 182 allows a portion of the fulcrum foot 150 to be recessed or embedded within hinge cover 210 (i.e., within mating groove 220). This enables a thicker fulcrum foot 150 to be used and a deeper mating overlap between the fulcrum foot and hinge cover 210. Embedding the fulcrum foot into the hinge cover also protects the bonding interface from shear stress loading and peel failure.

In some embodiments, the thickness of the fulcrum foot 150 may be substantially consistent along the entire length of the foot. In other embodiments, fulcrum foot 150 may be slightly thicker on an outboard side 132, than on an inboard side 134, of hinge assembly 130 as illustrated, for example, by the dotted line shown in FIG. 11(D). The gentle arcing of the fulcrum foot geometry shown in FIG. 11(D) ensures that the initial point of contact between hinge assembly 130 and the support surface is close to the hinge mounting bracket interface, which improves stability. When in contact with the support surface, fulcrum foot 150 contours to the support surface (due to deformation of the elastomeric material) and the gentle arc provides adequate height and contact loading to achieve optimal anti-slip and stability.

Figure 12A:
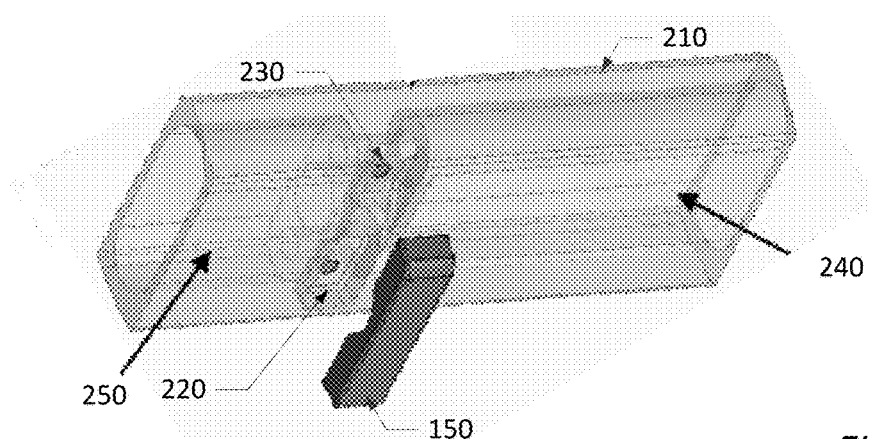
FIGS. 12(A)-(B) are rear perspective views illustrating another embodiment of a hinge cover, which may be used to enclose the internal components of the hinge assembly shown in FIG. 8, and a fulcrum foot that may be arranged on the hinge cover, according to another embodiment of the present disclosure.
Figure 12B:
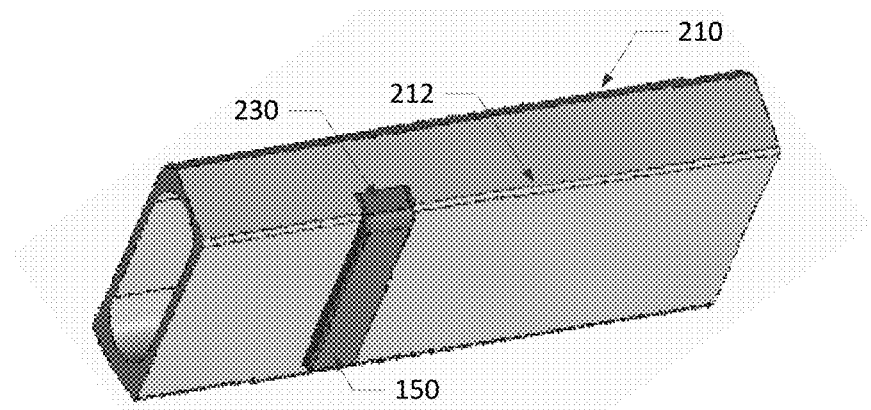

FIGS. 12(A)-(B) illustrate an alternative embodiment of a fulcrum foot 150 that may be provided on hinge cover 210, according to another embodiment of the present disclosure. Compared to the previous embodiment shown in FIGS. 11(A)-(D), the fulcrum foot 150 illustrated in FIGS. 12(A)-(B) is shorter, wider and configured to extend substantially across an entire width of the hinge cover 210. In some embodiments, fulcrum foot 150 and mating groove 220 may be arranged between a first cavity 240 formed within hinge cover 210 for housing the torque engine side of the hinge assembly, and a second cavity 250 formed within the hinge cover for housing the cable routing side of the hinge, as shown in the embodiment of FIGS. 12(A)-(B). In other embodiments (not shown), fulcrum foot 150 and mating groove 220 may be arranged along an inboard side of the hinge assembly where cable bundles are routed between the display screen and base 120. Placing the mating groove 220 between the first and second cavities 240/250 (or along the inboard side) allows a substantially thicker fulcrum foot 150 to be used, and increases depth of interlock and engagement between the fulcrum foot and the mating groove.

Like the previous embodiment, the mating groove 220 shown in FIGS. 12(A)-(B) may include holes 230 for receiving pegs formed on an underside of the fulcrum foot 150. In addition, the fulcrum foot 150 shown in FIGS. 12(A)-(B) may be formed from an elastomeric material, such as a rubber material or a silicon material over-molded onto a plastic frame, and may be bonded to mating groove 220 with an appropriate epoxy. In some embodiments, fulcrum foot 150 may wrap around an upper edge 212 of hinge cover 210. In such embodiments, fulcrum foot 150 may remain in contact with the support surface even when the lid 110 is rotated up to a usage angle of approximately 180°.

Figure 13A:
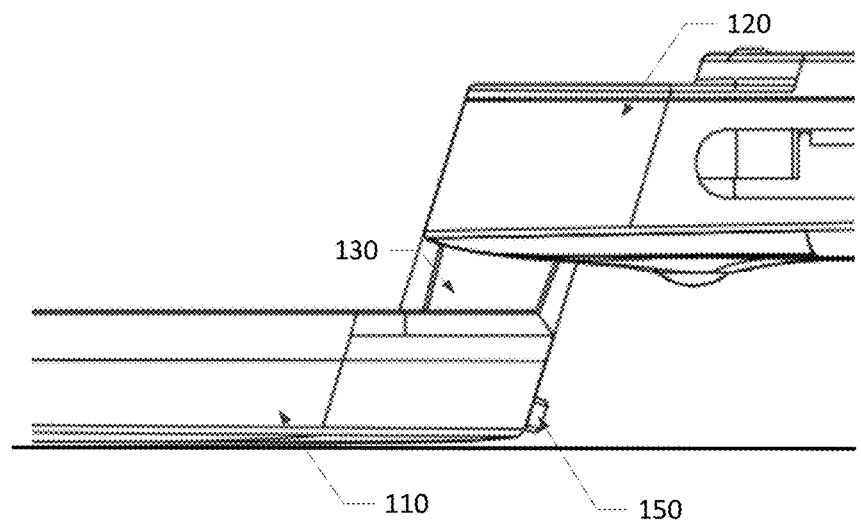
FIGS. 13(A)-(B) illustrate a rear portion of the portable IHS when the lid is rotated to a usage angle of approximately 180° to demonstrate a difference between the fulcrum foot embodiments shown in FIGS. 11(A)-(B) and FIGS. 12(A)-(B).
Figure 13B:
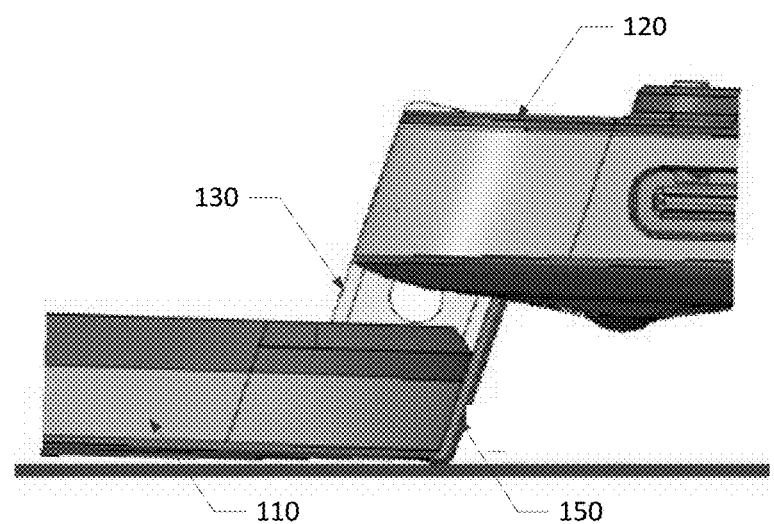

FIGS. 13(A)-(B) illustrate a rear portion of IHS 100 when lid 110 is rotated to a usage angle of approximately 180° to demonstrate a difference between the fulcrum foot 150 embodiments shown in FIGS. 11 and 12. As shown in FIG. 13(A), a top surface of the lid 110 rests upon the support surface when the fulcrum foot 150 shown in FIG. 11 is used and the lid is rotated approximately 180°. On the other hand, as shown in FIG. 13(B), the information handling system is supported by the fulcrum foot 150 embodiment of FIG. 12 when the lid 110 is rotated approximately 180°. In some embodiments, the fulcrum foot 150 shown in FIGS. 12(A)-(B) and 13(B) may protect the upper surface of the lid 110 by preventing the upper surface from contacting the support surface when the lid is rotated approximately 180°.

While the present disclosure may be adaptable to various modifications and alternative forms, specific embodiments have been shown by way of example and described herein. However, it should be understood that the present disclosure is not intended to be limited to the particular forms disclosed. Rather, the present disclosure is to cover all modifications, equivalents, and alternatives falling within the spirit and scope of the present disclosure as defined by the appended claims. Moreover, the different aspects of the disclosed systems and methods may be utilized in various combinations and/or independently. Thus, the present disclosure is not limited to only those combinations shown herein, but rather may include other combinations.

What is claimed is:

1. A hinge assembly rotationally coupled between a lid and a base of a portable information handling system (IHS), the hinge assembly comprising:

an upper hinge axle coupled to the lid of the portable IHS;

a lower hinge axle coupled to the base of the portable IHS, wherein the lower hinge axle rotates, while the upper hinge axle remains stationary, when the lid is rotated from a closed position to a usage angle of approximately 180°;

a hinge cover encompassing the upper and lower hinge axles;

a fulcrum foot provided on the hinge cover, wherein the fulcrum foot initially contacts a support surface when the lid is rotated to a first usage angle and continues to support the portable IHS on the support surface as the lid is rotated further through a wide range of usage angles;

wherein a rear portion of the base lifts away from the support surface when the lid is rotated substantially beyond the first usage angle; and wherein the upper and lower hinge axles are offset by an offset angle θ of approximately 10°-20° from a vertical axis to reduce an amount by which the rear portion of the base lifts away from the support surface over the wide range of usage angles.

2. The hinge assembly as recited in claim 1, wherein the upper hinge axle rotates, while the lower hinge axle remains stationary, when the lid is rotated between approximately 180° and approximately 360°.

3. The hinge assembly as recited in claim 1, wherein the fulcrum foot remains in contact with the support surface as the lid is rotated through a wide range of usage angles between about 110° and about 180°.

4. The hinge assembly as recited in claim 1, wherein the fulcrum foot is arranged near an upper edge of the hinge cover and extends across a length of the hinge cover.

5. The hinge assembly as recited in claim 1, wherein the fulcrum foot extends across a width of the hinge cover and wraps around an upper edge of the hinge cover.

6. The hinge assembly as recited in claim 1, wherein a portion of the fulcrum foot is recessed within a mating groove formed within the hinge cover.

7. The hinge assembly as recited in claim 1, wherein the fulcrum foot comprises an elastomeric material.

8. The hinge assembly as recited in claim 1, further comprising:
a lower torque engine comprising the lower hinge axle and a lower variable torque mechanism that adjusts an amount of friction applied to the lower hinge axle as the lid is rotated from about 0° to about 180°;
an upper torque engine comprising the upper hinge axle and an upper torque mechanism that applies friction to the upper hinge axle as the lid is rotated from about 180° to about 360°;
a switching mechanism coupled to switch rotation from the lower torque engine to the upper torque engine when the lid is rotated beyond approximately 180°;
a lower axle mounting feature coupled between the lower hinge axle and a lower mounting bracket of the hinge assembly; and
an upper axle mounting feature coupled between the upper hinge axle and an upper mounting bracket of the hinge assembly.

9. The hinge assembly as recited in claim 8, wherein the upper and lower torque engines, the switching mechanism and the upper and lower axle mounting features are each shifted by the offset angle θ.

10. A portable information handling system (IHS) configured to rest upon a support surface, the portable IHS comprising:
a lid including a display screen;
a base including a main chassis portion; and
a hinge assembly rotationally coupled between the lid and the base, wherein the hinge assembly comprises:
an upper hinge axle coupled to the lid;
a lower hinge axle coupled to the base, wherein the lower hinge axle rotates, while the upper hinge axle remains stationary, when the lid is rotated from a closed position to a usage angle of approximately 180°;
a hinge cover encompassing the upper and lower hinge axles, wherein the hinge cover contacts the support surface when the lid is rotated to a first usage angle between approximately 100° and 120°; and
wherein further rotation of the lid beyond the first usage angle causes a rear portion of the base to lift away from the support surface and conceal an increasing greater portion of a lower bezel surrounding the display screen.

11. The portable information handling system as recited in claim 10, wherein the upper hinge axle rotates, while the lower hinge axle remains stationary, when the lid is rotated between approximately 180° and approximately 360°.

12. The portable information handling system as recited in claim 10, wherein the upper and lower hinge axles are offset by an offset angle θ of approximately 10°-20° from a vertical axis to reduce an amount by which the rear portion of the base lifts away from the support surface when the lid is rotated beyond the first usage angle.

13. The portable information handling system as recited in claim 10, wherein the hinge assembly further comprises:
a lower torque engine comprising the lower hinge axle and a lower variable torque mechanism that adjusts an amount of friction applied to the lower hinge axle as the lid is rotated from about 0° to about 180°;
an upper torque engine comprising the upper hinge axle and an upper torque mechanism that applies friction to the upper hinge axle as the lid is rotated from about 180° to about 360°;
a switching mechanism coupled to switch rotation from the lower torque engine to the upper torque engine when the lid is rotated beyond approximately 180°;
a lower axle mounting feature coupled between the lower hinge axle and a lower mounting bracket of the hinge assembly; and
an upper axle mounting feature coupled between the upper hinge axle and an upper mounting bracket of the hinge assembly.

14. The portable information handling system as recited in claim 13, wherein the upper and lower torque engines, the switching mechanism and the upper and lower axle mounting features are each shifted by an offset angle θ of approximately 10°-20° from a vertical axis to reduce an amount by which the rear portion of the base lifts away from the support surface when the lid is rotated beyond the first usage angle.

15. The portable information handling system as recited in claim 10, wherein the hinge cover comprises a fulcrum foot, and wherein the fulcrum foot initially contacts the support surface when the lid is rotated to the first usage angle and continues to support the portable IHS on the support surface as the lid is rotated further through a wide range of usage angles.

16. The portable information handling system as recited in claim 15, wherein the fulcrum foot remains in contact with the support surface as the lid is rotated through a wide range of usage angles between about 110° and about 180°.

17. The portable information handling system as recited in claim 15, wherein the fulcrum foot is arranged near an upper edge of the hinge cover and extends across a length of the hinge cover.

18. The portable information handling system as recited in claim 15, wherein the fulcrum foot extends across a width of the hinge cover and wraps around an upper edge of the hinge cover.

19. The portable information handling system as recited in claim 15, wherein a portion of the fulcrum foot is recessed within a mating groove formed within the hinge cover.

20. The portable information handling system as recited in claim 15, wherein the fulcrum foot comprises an elastomeric material.

* * * * *